(12) United States Patent
Ameye et al.

(10) Patent No.: US 8,653,201 B2
(45) Date of Patent: Feb. 18, 2014

(54) ETHYLENE POLYMER COMPOSITION

(75) Inventors: Thomas F. Ameye, Grimbergen (BE); Dominique Jan, Beaufays (BE); Fabian Siberdt, Brussels (BE)

(73) Assignee: Ineos Manufacturing Belgium NV, Antwerp (BE)

( * ) Notice: Subject to any disclaimer, the term of this patent is extended or adjusted under 35 U.S.C. 154(b) by 0 days.

(21) Appl. No.: 11/991,182

(22) PCT Filed: Aug. 31, 2006

(86) PCT No.: PCT/EP2006/008576
§ 371 (c)(1),
(2), (4) Date: Apr. 8, 2008

(87) PCT Pub. No.: WO2007/028552
PCT Pub. Date: Mar. 15, 2007

(65) Prior Publication Data
US 2009/0131595 A1   May 21, 2009

(30) Foreign Application Priority Data
Sep. 5, 2005 (EP) .................................. 05255418

(51) Int. Cl.
*C08L 23/06* (2006.01)
*C08G 85/00* (2006.01)

(52) U.S. Cl.
USPC .............. 525/324; 525/247; 526/65; 526/348

(58) Field of Classification Search
USPC ................. 525/53, 247, 324; 526/65, 348
See application file for complete search history.

(56) References Cited

U.S. PATENT DOCUMENTS

| | | | |
|---|---|---|---|
| 2001/0014724 A1* | 8/2001 | Promel et al. | 526/65 |
| 2004/0157988 A1* | 8/2004 | Miserque et al. | 525/53 |
| 2004/0181010 A1* | 9/2004 | Miserque et al. | 525/191 |
| 2010/0056714 A1* | 3/2010 | McPhee | 524/579 |

FOREIGN PATENT DOCUMENTS

| | | | | |
|---|---|---|---|---|
| EP | 0 603 935 A1 | 12/1993 | | |
| EP | 0 739 909 A1 | 10/1996 | | |
| EP | 1 201 711 A1 | 5/2002 | | |
| EP | 1 201 713 A1 | 5/2002 | | |
| EP | 1 359 192 A1 | 11/2003 | | |
| EP | 1489112 A2 * | 12/2004 | | C08F 210/02 |
| WO | WO 02/102891 A1 | 12/2002 | | |

OTHER PUBLICATIONS

Declaration and Experimental report on D8 by Backman (2010).*

* cited by examiner

*Primary Examiner* — Mark Kaucher
(74) *Attorney, Agent, or Firm* — Nixon & Vanderhye

(57) ABSTRACT

A composition suitable for use in pressure pipes and pipe fittings is disclosed comprising polymer of ethylene and from 0.5 to 5 wt % of a $C_4$-$C_8$ alpha-olefin which has a natural density of 935-956 kg/m$^3$, a melt index $MI_5$ of 0.15-0.5 g/10 min, a dynamic complex viscosity at 100 rad/s and 190° C. ($\eta_{100}$) of no more than 2500 Pa·s, a relationship between $\eta_{100}$ and dynamic complex viscosity measured in Pa·s at 0.01 rad/s and 190° C. ($\eta_{0.01}$) defined by the equation $\eta_{0.01}$>115000+30. $\eta_{100}$, and an environmental stress crack resistance as measured by a notched pipe test performed according to ISO13479:1997 on 110 mm SDR 11 pipes at 80° C. and a pressure of 9.2 bar, of greater than 1000 hours, or: wherein the $C_4$-$C_8$ alpha-olefin is 1-hexene or 1-octene.

11 Claims, 1 Drawing Sheet

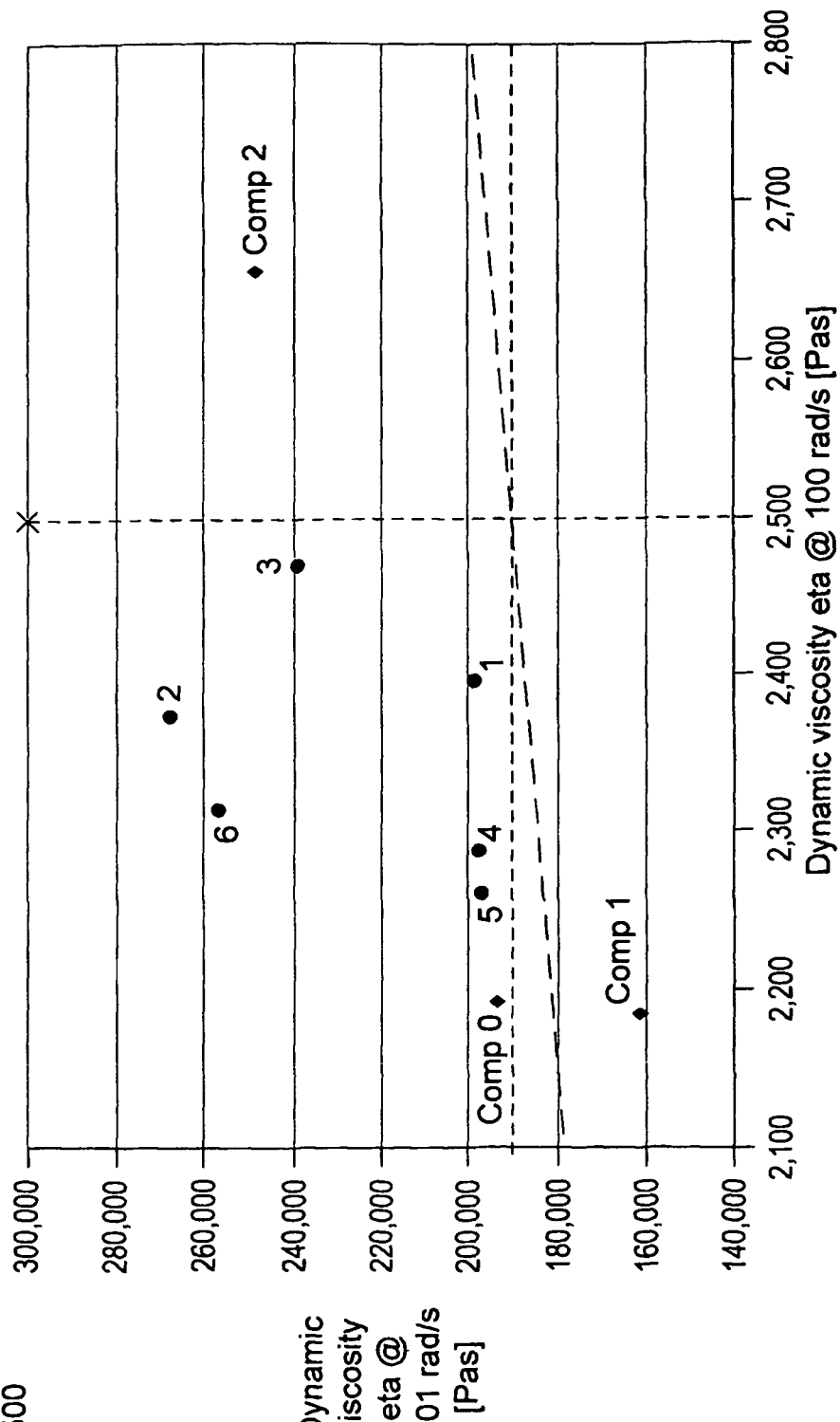

ETHYLENE POLYMER COMPOSITION

This application is the U.S. National Phase of International Application PCT/EP2006/008576, filed 31 Aug. 2006, which designated the U.S. PCT/EP2006/008576 claims priority to European Application No. 05255418.5 filed 5 Sep. 2005. The entire content of these applications are incorporated herein by reference.

The present invention relates to polyethylene resins, more particularly those suitable for use as pipes, pipe attachments or fittings, and to a process for producing such resins. The present invention also relates to the use of polyethylene compounds comprising such resins for the manufacture of pipes or pipe fittings, and to such fittings themselves.

For many high density polyethylene (HDPE) applications, polyethylene with enhanced toughness, strength and environmental stress cracking resistance (ESCR) is important. These enhanced properties are more readily attainable with high molecular weight polyethylene. However, as the molecular weight of the polymer increases, the processability of the resin decreases. By providing a polymer with a broad or bimodal molecular weight distribution (MWD), the desired properties that are characteristic of high molecular weight resins are retained while processability, particularly extrudability, is improved.

Polyethylene resins are known for the production of pipes and fittings. Pipe resins require high stiffness (creep rupture strength), combined with a high resistance against slow crack growth as well as resistance to crack propagation yielding impact toughness.

Polyethylene pipes are widely used as they are lightweight and can be easily assembled by fusion welding. Polyethylene pipes also have a good flexibility and impact resistance, and are corrosion free. However unless they are reinforced, they are limited in their hydrostatic resistance by the inherent low yield strength of polyethylene. It is generally accepted that the higher the density of the polyethylene, the higher will be the long term hydrostatic strength. The classification for pipe is described in ISO 9080 and ISO 12162. These are polyethylene resins which when used for the formation of pipes of specific dimensions, survive a long term pressure test at different temperatures for a period of 5,000 hours. Extrapolation according to ISO 9080 shows that they have an extrapolated 20° C./50 years stress at a lower prediction level (97.5% confidence level—"LPL") of at least 8 and 10 MPa; such resins are known as PE80 and PE100 resins respectively. The density of the current basic powder used in the production of a PE100 compound is close to 0.950 g/cm$^3$ (typically from 0.949 to 0.951 g/cm$^3$). Such polyethylene resins containing conventional amounts of black pigments have densities from about 0.959 to 0.961 g/cm$^3$.

In addition, it is desired that resins used for the manufacture of such pipes have good resistance to sagging, so that when the resin exits the extruder die in the form of a pipe it does not deform under its own weight before it cools and solidifies.

WO 02/102891 discloses a high density multimodal polyethylene for use in pipes or fittings, wherein the resin contains 0.15-1 mol % of a $C_4$-$C_8$ alpha-olefin such as 1-hexene, and typically has an MI$_5$ of 0.15-2 g/10 min, a density of at least 950 kg/m$^3$, and a low molecular weight fraction comprising at least 53 wt % of the resin. This resin has relatively poor stress crack resistance however, as measured by FNCT.

We have found that by selecting a particular product design it is possible to obtain resins having both a good resistance to sag, good processability and also excellent stress crack resistance Dynamic complex viscosity measured at 100 rad/s, $\eta_{100}$, which is related to the molecular weight of the polymer, is the viscosity at shear rates of the order typically experienced during extrusion processes, and affects extruder motor power consumption, melt pressure generation at the die etc; a low $\eta_{100}$ is desirable for good processability. Dynamic complex viscosity measured at 0.01 rad/s, $\eta_{0.01}$, is the viscosity at low shear rates which provides information regarding the sagging behavior of a resin. A high $\eta_{0.01}$ is normally desirable.

In a first aspect therefore, the present invention provides a polymer of ethylene and from 0.5 to 5 wt % of a $C_4$-$C_8$ alpha-olefin which has a natural density of 935-956 kg/m$^3$, a melt index MI$_5$ of 0.15-0.5 g/10 min, a dynamic complex viscosity at 100 rad/s and 190° C. ($\eta_{100}$) of no more than 2500 Pa·s, a relationship between $\eta_{100}$ and dynamic complex viscosity measured in Pa·s at 0.01 rad/s and 190° C. ($\eta_{0.01}$), defined by the equation $\eta_{0.01} > 115000 + 30 \cdot \eta_{100}$, and an environmental stress crack resistance as measured by a notched pipe test performed according to ISO13479:1997 on 110 mm SDR 11 pipes at 80° C. and a pressure of 9.2 bar, of greater than 1000 hours. Preferably the $C_4$-$C_8$ alpha-olefin is 1-hexene, 1-pentene or 1-octene.

An alternative aspect of the invention provides a polymer of ethylene and from 0.5 to 5 wt % of 1-hexene, 1-pentene or 1-octene and having a natural density of 935-956 kg/m$^3$, a melt index MI$_5$ of 0.15-0.5 g/10 min, and a relationship between dynamic complex viscosity at 100 rad/s and 190° C. ($\eta_{100}$) and dynamic complex viscosity measured in Pa·s at 0.01 rad/s and 190° C. ($\eta_{0.01}$), defined by the equation $\eta_{0.01} > 115000 + 30 \cdot \eta_{100}$. Preferably the composition has an environmental stress crack resistance as measured by a notched pipe test performed according to ISO13479:1997 on 110 mm SDR 11 pipes at 80° C. and a pressure of 9.2 bar, of greater than 1000 hours.

It is preferred that the polymer of the second aspect of the invention has a dynamic complex viscosity at 100 rad/s and 190° C. ($\eta_{100}$) of no more than 2500 Pa·s.

It is preferred that the polymers of both aspects of the invention have a dynamic complex viscosity at 0.01 rad/s ($\eta_{0.01}$) and 190° C. of at least 190000 Pa·s.

Preferably the composition of the invention has an MI$_5$ of 0.2-0.32 g/10 min and a natural density of 946-953 kg/m$^3$.

In a particularly preferred embodiment of the invention the composition is formed from a multimodal polyethylene resin which comprises from 30 to 70 wt % of an ethylene homopolymer (A) having a melt index MI$_2$ of 5-1000 g/10 min and a density of at least 965 kg/m$^3$, and from 30 to 70 wt % of a copolymer (B) of ethylene and a $C_4$-$C_8$ alpha-olefin having a melt index MI$_5$ of 0.001-2 g/10 min and a density of 910 to 945 kg/m$^3$. In the composition according to the second aspect of the invention, the $C_4$-$C_8$ alpha-olefin is of course 1-hexene or 1-octene; in that of the first aspect of the invention, it is preferably 1-hexene or 1-octene.

By "multimodal" polyethylene is meant polyethylene having at least two components of different molecular weights and compositions (ie comonomer content). Preferably the resin composition is bimodal, that is to say it has just two such components, although each component may itself be multimodal.

In the preferred multimodal polyethylene of the invention, the homopolymer (A) preferably has an MI$_2$ of 100-800 g/10 min; the copolymer (B) preferably has a density of 920-928 kg/m$^3$; and the block ratio A:B is preferably 45:55-55:45, more preferably 48:52-55:45.

The present invention further provides the use of such a polyethylene resin for the manufacture of pipes and fittings, and in a further aspect a pipe or fitting comprising the polyethylene resin of the invention.

Preferably the high molecular weight fraction comprises from 0.1-10 wt % of comonomer (preferably 1-hexene or 1-octene).

For the purposes of the present invention, melt flow indices $MI_2$ and $MI_5$ respectively, denote the melt flow indices measured according to ISO Standard 1133 at a temperature of 190° C. under loads of 2.16 kg and 5 kg respectively. Furthermore, melt flow index HLMI is understood to denote the melt flow index measured according to ISO Standard 1133 at a temperature of 190° C. under a load of 21.6 kg.

The following discussion refers to the preferred embodiment of the invention in which the resin is a multimodal resin as defined above. References to $C_4$-$C_8$ alpha-olefin comonomer relating to the first aspect of the invention should be considered to refer specifically to 1-hexene or 1-octene in the alternative embodiment of the invention in which the alpha-olefin comonomer is specifically one of those monomers. Similarly, references to 1-hexene or 1-octene in the alternative embodiment of the invention may be considered to represent $C_4$-$C_8$ alpha-olefin in the first embodiment.

The density of the polymer (A) present in the resins according to the invention is preferably at least 965 kg/m$^3$. The density of copolymer (B) is preferably at least 910 kg/m$^3$. The density of copolymer (B) does not exceed preferably 930 kg/m$^3$, more particularly not 928 kg/m$^3$.

For the purposes of the present invention, ethylene polymer (A) is an ethylene polymer comprising monomer units derived from ethylene and possibly monomer units derived from other olefins. Copolymer (B) is a copolymer comprising monomer units derived from ethylene and monomer units derived from 1-hexene or 1-octene.

For the purposes of the present invention, hexene or octene content is measured by RMN$^{13}$C according to the method described in J. C. RANDALL, JMS-REV. MACROMOL. CHEM. PHYS., C29(2&3), p. 201-317 (1989). For example the content of units derived from the comonomer is calculated from measurements of the integrals of the characteristic spectral lines of the comonomer (eg for hexene 23.4; 34.9 and 38.1 ppm) with respect to the integral of the characteristic spectral line of the units derived from ethylene (30 ppm).

The content in copolymer (B) of monomer units derived from 1-hexene or 1-octene, hereinafter called comonomer content, is generally at least 0.4 mole %, in particular at least 0.6 mole %. The comonomer content of copolymer (13) is usually at most 1.8 mole %, preferably at most 1.5 mole %. Particularly preferred is a comonomer content that is between 0.7 and 1.1 mole %.

Ethylene polymer (A) may optionally contain monomer units derived from another olefin. Ethylene polymer (A) comprises preferably at least 99.5 mole %, more particularly at least 99.8, mole % of monomer units derived from ethylene. Particularly preferred is an ethylene homopolymer.

Polymer (A) according to the invention preferably has an $MI_2$ of at least 100, preferably at least 250 g/10 min. The $MI_2$ of polymer (A) generally does not exceed 1000 g/10 min, preferably no more than 700 g/10 min.

The melt index $MI_5$ of copolymer (B) according to the invention is preferably at least 0.005 g/10 min. It preferably does not exceed 0.1 g/10 min. Copolymer (B) presents advantageously an HLMI of at least 0.05 g/10 min which also does not exceed 2 g/10 min.

The resins of the invention may be obtained by any known process. In one embodiment, the resins are obtained by polymerising ethylene in a first reactor in order to form ethylene homopolymer (A), and then in a second reactor polymerising ethylene plus either 1-hexene, 1-pentene or 1-octene and optionally another alpha-olefin containing from 4 to 10 carbon atoms in the presence of homopolymer (A) to form ethylene copolymer (B). In an alternative embodiment the copolymer (B) is formed in the first reactor, and then homopolymer (A) is formed in the presence of copolymer (B) in the second reactor. In a further embodiment homopolymer (A) and copolymer (B) are formed in either order in a single reactor. Alternatively, homopolymer (A) and copolymer (B) may be made separately, and physically blended. All of these processes are preferably carried out as a suspension (slurry) polymerisation in the presence of a diluent.

The resins of the invention are preferably obtained by means of a process utilising at least two polymerisation reactors connected in series, according to which process:

in a first reactor, ethylene is polymerised in suspension in a medium comprising a diluent, hydrogen, a catalyst based on a transition metal and a cocatalyst so as to form from 30 to 70% by weight with respect to the total weight of the composition of ethylene polymer (A), said medium comprising polymer (A) in addition is drawn off from said reactor and is subjected to expansion so as to degas at least part of the hydrogen, after which said at least partially degassed medium comprising polymer (A) and some ethylene and 1-hexene, 1-pentene or 1-octene and optionally at least another alpha-olefin containing from 4 to 10 carbon atoms are introduced into a further reactor in which polymerisation in suspension is effected in order to form from 30 to 70% by weight with respect to the total weight of the composition of ethylene copolymer (B).

Polymerisation in suspension means polymerisation in a diluent which is in the liquid or supercritical state in the polymerisation conditions (temperature, pressure) used, these polymerisation conditions or the diluent being such that at least 50% by weight (preferably at least 70%) of the polymer formed is insoluble in said diluent.

The diluent used in this polymerisation process is usually a hydrocarbon diluent, inert to the catalyst, to the cocatalyst and to the polymer formed, such for example as a linear or branched alkane or a cycloalkane, having from 3 to 8 carbon atoms, such as hexane or isobutane.

The quantity of hydrogen introduced into the first reactor is in general set so as to obtain, in the diluent, a molar ratio between hydrogen and ethylene of 0.05 to 1. In the first reactor, this molar ratio is preferably at least 0.1.

The medium drawn off from the first reactor comprising in addition the polymer (A) is subjected to expansion so as to eliminate (degas) at least part of the hydrogen. The expansion is advantageously effected at a temperature below or equal to the polymerisation temperature in the first reactor. The temperature at which the expansion is effected is usually greater than 20° C., it is preferably at least 40° C. The pressure at which the expansion is carried out is below the pressure in the first reactor. The expansion pressure is preferably below 1.5 MPa. The expansion pressure is usually at least 0.1 MPa. The quantity of hydrogen still present in the at least partially degassed medium is generally below 1% by weight of the quantity of hydrogen initially present in the medium drawn off from the first polymerisation reactor, this quantity is preferably below 0.5%. The quantity of hydrogen present in the partially degassed medium introduced into the further polymerisation reactor is therefore low or even nil. The further reactor is preferably also supplied with hydrogen. The quantity of hydrogen introduced into the further reactor is in general set so as to obtain, in the diluent, a molar ratio between hydrogen and ethylene of 0.001 to 0.1. In this further reactor, this molar ratio is preferably at least 0.004. It preferably does not exceed 0.05. In the process according to the invention, the ratio between the hydrogen concentration in the diluent in the first reactor and that in the further polymerisation reactor is usually at least 20, preferably at least 30. Particularly preferred is a ratio of concentrations of at least 40. This ratio does not usually exceed 300, preferably not 200.

The quantity of 1-hexene or 1-octene introduced into the further polymerisation reactor is such that in the further reactor the comonomer/ethylene molar ratio in the diluent is preferably at least 0.05, more preferably at least 0.1. The comonomer/ethylene molar ratio preferably does not exceed 3, more preferably not 2.8.

The catalyst employed in the polymerisation process may be any catalyst(s) suitable for preparing the low and high density fractions. Preferably, the same catalyst produces both the high and low molecular weight fractions. For example, the catalyst may be a chromium catalyst, a Ziegler-Natta catalyst, or a metallocene catalyst. Preferably the catalyst is a Ziegler-Natta catalyst.

In the case of a Ziegler-Natta catalyst, the catalyst used comprises at least one transition metal. Transition metal means a metal of groups 4, 5 or 6 of the Periodic Table of elements (CRC Handbook of Chemistry and Physics, 75th edition, 199495). The transition metal is preferably titanium and/or zirconium. A catalyst comprising not only the transition metal but also magnesium is preferably utilised. Good results have been obtained with catalysts comprising:

from 5 to 30%, preferably from 10 to 20%, more preferably 12 to 18% by weight of transition metal,
from 0.5 to 20%, preferably from 1 to 10%, more preferably 4 to 8% by weight of magnesium,
from 20 to 70%, preferably from 30 to 60%, more preferably 40 to 55% by weight of halogen, such as chlorine,
from 0.1 to 10%, preferably from 0.5 to 5%, more preferably 2 to 3% by weight of aluminium;

the balance generally consisting of elements arising from products used for their manufacture, such as carbon, hydrogen and oxygen. These catalysts are preferably obtained by coprecipitation of at least one transition metal composition and a magnesium composition by means of a halogenated organoaluminium composition. Such catalysts are known, they have notably been described in U.S. Pat. No. 3,901,863, U.S. Pat. No. 4,294,2200 and U.S. Pat. No. 4,617,360. The catalyst is preferably introduced only into the first polymerisation reactor, i.e. there is no introduction of fresh catalyst into the further polymerisation reactor. The amount of catalyst introduced into the first reactor is generally adjusted so as to obtain an amount of at least 0.5 mg of transition metal per liter of diluent. The amount of catalyst usually does not exceed 100 mg of transition metal per liter of diluent.

Particularly preferred catalysts contain 5 to 30% by weight of transition metal, 0.5 to 20% by weight of magnesium, 20 to 70% by weight of chlorine and 0.1 to 10% by weight of aluminium, and have a residual organic radical content in the precipitated catalyst of less than 35 wt %. These catalysts are also obtained by coprecipitation of at least one transition metal compound and a magnesium compound by means of a halogenated organoaluminium compound, but with a ratio of transition metal to magnesium of no more than about 1:1. They are described in more detail in our own EP 703247B. Most preferred catalysts have the following composition:
Transition metal from 8 to 16% by weight.
Magnesium content from 5 to 15% by weight.
P Chlorine content from 40 to 60% by weight.
Aluminium content less than 5% by weight.
Residual organic content less than 35% by weight.
Total alkyl benzoate content less than 20% by weight.

The cocatalyst utilised in the process is preferably an organoaluminium compound. Unhalogenated organoaluminium compounds of formula $AlR_3$ in which R represents an allyl grouping having from 1 to 8 carbon atoms are preferred. Particularly preferred are triethylaluminium and triisobutylaluminium. The cocatalyst is introduced into the first polymerisation reactor. Fresh cocatalyst may also be introduced into the further reactor. The quantity of cocatalyst introduced into the first reactor is in general at least $0.1 \times 10^{-3}$ mole per liter of diluent. It does not usually exceed $5 \times 10^{-3}$ mole per liter of diluent. Any quantity of fresh cocatalyst introduced into the further reactor does not usually exceed $5 \times 10^{-3}$ mole per liter of diluent.

In the preferred process of the invention using a Ziegler-Natta catalyst, the polymerisation temperature is generally from 20 to 130° C. It is preferably at least 60° C. For preference, it does not exceed 115° C. The total pressure at which the process is effected is in general from 0.1 MPa to 10 MPa. In the first polymerisation reactor, the total pressure is preferably at least 2.5 MPa. Preferably, it does not exceed 5 MPa. In the further polymerisation reactor, the total pressure is preferably at least 1.3 MPa. Preferably, it does not exceed 4.3 MPa.

The period of polymerisation in the first reactor and in the further reactor is in general at least 20 minutes, preferably at least 30 minutes. It does not usually exceed 5 hours, preferably not 3 hours.

In this process, a suspension comprising the resin of the invention is collected at the outlet of the further polymerisation reactor. The composition may be separated from the suspension by any known means. Usually, the suspension is subjected to a pressure expansion (final expansion) so as to eliminate the diluent, the ethylene, the alpha-olefin and any hydrogen from the composition.

This process makes it possible to obtain, with a good yield and with a low oligomers content, a composition having a very good compromise between mechanical properties and utilisation properties.

The compositions of the invention are well suited to the manufacture of pipes and pipe fittings, particularly pipes for the conveying of fluids under pressure such as water and gas. The invention therefore also concerns the use of a composition according to the invention for the manufacture of pipes or pipe fittings. Naturally, when they are used for the molten forming of articles, and more particularly for the manufacture of pipes or pipe fittings, the compositions of the invention may be mixed with the usual additives for utilisation of polyolefins, such as stabilisers (antioxidant agents, anti-acids and/or anti-UVs), antistatic agents and utilisation agents ("processing aid"), and pigments. The invention therefore concerns also a mixture comprising a composition according to the invention and at least one of the additives described above. Particularly preferred are mixtures comprising at least 95%, preferably at least 97%, by weight of a composition according to the invention and at least one of the additives described above. The manufacture of pipes by extrusion of a composition according to the invention is preferably carried out on an extrusion line comprising an extruder, a sizer and a drawing device. Extrusion is generally performed on an extruder of the single-screw type and at a temperature of 150 to 230° C. The sizing of the pipes may be effected by the creation of negative pressure outside the pipe and/or by the creation of positive pressure inside the pipe.

It is preferred that pipes manufactured from the compositions according to the invention are characterised by:

good environmental stress crack resistance as measured by a notched pipe test performed according to ISO 13479:1997 on 110 mm SDR 11 pipes at 80° C. and a pressure of 9.2 bar, of greater than 1000 hours good resistance to rapid propagation of cracks (RCP), reflected by a halting of crack propagation at an internal pressure generally equal to at least 10 bar, as measured at 0° C. on a pipe of diameter 11 Onun and thickness 10 mm according to method S4 described in ISO standard F/DIS 13477 (1997);

good long-term pressure resistance which may enable them to be attributed a higher MRS rating than the MRS 10 rating according to standard ISO/TR 9080.

The following examples are intended to illustrate the invention.

EXAMPLES

A) Catalysts

Catalyst (I)

Magnesium diethoxide was reacted with titanium tetrabutoxide for 4 hours at 140° C. in an amount such that the molar ratio of titanium to magnesium was equal to 1. The reaction product thus obtained was subsequently chlorinated and precipitated by bringing the latter into contact with an ethylaluminum dichloride solution (EADC) for 90 minutes at 45° C. The EADC/Mg ratio was 6.5 mole/mole. The obtained slurry was subsequently aged at 60° C. for 45 minutes, and then cooled at ambient temperature (<35° C.). The by-products from the chlorination reaction were removed from the slurry by washing the solid with polymerisation grade hexane at ambient temperature. The catalyst thus obtained, collected from the suspension, comprised (% by weight):

Ti: 17; Cl: 41; Al: 2; Mg: 5.

Catalyst (II)

Magnesium diethoxide was reacted with titanium tetrabutoxide for 7 hours at 140±5° C. in an amount such that the molar ratio of titanium to magnesium was equal to 1. The reaction product thus obtained (mixed alcoholate) was subsequently contacted with ethylbenzoate (EB) at ambient temperature for at least 6 hours. The mixture of mixed alcoholate and ethyl benzoate was then reacted with aluminium isobutyl dichloride (IBADIC), in two steps. The first step was performed at 45° C., the second step at 45° C.

The amount of IBADIC introduced at the end of the first step corresponded to a IBADIC/Mg ratio of 4.5 mole/mole. A partial elimination of the chlorination by-products was effected by decantation of the solid and removal of the supernatant liquid. The amount of IBADIC introduced at the end of the second chlorination step corresponded to a IBADIC/Mg ratio of 2.5 mole/mole. After the second chlorination step, the slurry was aged at 60° C. for 45 minutes, and subsequently cooled at ambient temperature (less than 35° C.). The reaction by-products were then removed from the slurry by washing the solid with polymerisation grade hexane. The catalyst thus obtained, collected from the suspension, comprised (% by weight):

Ti: 13; Cl: 51; Al: 2; Mg: 7. The concentration of total benzoates in the catalyst was about 10 wt %.

B) Composition

The manufacture of a composition according to the invention was carried out in suspension in isobutane in two loop reactors, connected in series and separated by a device which makes it possible continuously to carry out the reduction in pressure. Isobutane, ethylene, hydrogen, triethylaluminium (30-50 ppm) and the above catalyst were continuously introduced into the first loop reactor and the polymerization of ethylene was carried out in this mixture in order to form the homopolymer (A). The said mixture, additionally comprising the homopolymer (A), was continuously withdrawn from the said reactor and was subjected to a reduction in pressure (~50° C., 0.6 MPa), so as to remove at least a portion of the hydrogen. The resulting mixture, at least partially degassed of hydrogen, was then continuously introduced into a second polymerization reactor, at the same time as ethylene, hexene, isobutane and hydrogen, and the polymerization of the ethylene and of the hexene was carried out therein in order to form the ethylene/1-hexene copolymer (B). The suspension comprising the composition comprising ethylene polymers was continuously withdrawn from the second reactor and this suspension was subjected to a final reduction in pressure, so as to evaporate the isobutane and the reactants present (ethylene, hexene and hydrogen) and to recover the composition in the form of a powder, which was subjected to drying in order to complete the degassing of the isobutane.

The other polymerisation conditions are specified in Table 1.

The properties of the compositions are presented in Table 2. The compositions were made on a pilot-scale extrusion line. Dynamic Rheology Analyses were performed on the compositions of the invention in pellet form so as to determine the complex dynamic shear viscosity, $\eta$, at 190° C.

Dynamic Rheological Analysis

Rheological measurements were carried out on an oscillatory rheometer (e.g., Rheometrics RDS-2, ARES) with 25 mm diameter parallel plates in a dynamic mode under an inert (nitrogen) atmosphere. For all experiments, the rheometer was thermally stable at 190° C. for at least 30 minutes before inserting the appropriately stabilised (with anti-oxidant additives), compression-moulded sample of resin onto the parallel plates. The plates were then closed with a positive normal force registered on the meter to ensure good contact. After about 5 minutes at 190° C., the plates were lightly compressed and the surplus polymer at the circumference of the plates trimmed. A further 10 minutes was allowed for thermal stability and for the normal force to decrease back to zero.

Two strain sweep (SS) experiments were initially carried out at 190° C. under nitrogen to determine the linear viscoelastic strain that would generate a torque signal which is greater than 10% of the lower scale of the transducer, over the full frequency (e.g. 0.01 to 100 rad/s) range. The first SS experiment was carried out with a low applied frequency of 0.1 rad/s so as to determine the sensitivity of the torque at low frequency. The second SS experiment was carried out with a high applied frequency of 100 rad/s to ensure that the selected applied strain is well within the linear viscoelastic region of the polymer so that the oscillatory rheological measurements do not induce structural changes to the polymer during testing. In addition, a time sweep (TS) experiment was carried out with a low applied frequency of 0.1 rad/s at the selected strain under nitrogen (as determined by the SS experiments) to check the stability of the sample during testing.

Measurement of Complex Dynamic Shear Viscosity, $\eta(100)$ and $\eta(0.01)$, at 190° C.

The frequency sweep (FS) experiment was then carried out at 190° C. using the above appropriately selected strain level between dynamic frequencies range of $10^{-2}$ to 100 rad/s under a nitrogen atmosphere. The complex dynamic shear viscosities, $\eta(100)$ in Pa·s, at dynamic frequency of 100 rad/s, and $\eta(0.01)$, at a dynamic frequency of 0.01 rad/s, were determined directly from the viscosity data of the frequency sweep (FS) experiment measured at 190° C.

Notched Pipe Test (NPT)

The notched pipe test was performed according to ISO13479:1997 on 110 mm SDR 11 pipes. The test was run at 80° C. at a pressure of 9.2 bar.

TABLE 1 polymerisation conditions for selected examples of the invention

| | EXAMPLE | | | | | |
|---|---|---|---|---|---|---|
| | 1 | 2 | 3 | 4 | 5 | 6 |
| Catalyst | I | I | I | II | II | I |
| REACTOR 1 | | | | | | |
| C2 (g/kg) | 20.7 | 17.6 | 17.4 | 11.3 | 15.9 | 19.2 |
| H2/C2 (mole/mole) | 0.374 | 0.462 | 0.464 | 0.546 | 0.458 | 0.347 |
| T (° C.) | 90 | 90 | 90 | 90 | 90 | 95 |
| Residence time (h) | 1.57 | 1.58 | 1.57 | 1.58 | 1.59 | 1.29 |
| REACTOR 2 | | | | | | |
| C2 (g/kg) | 16.4 | 16.4 | 20.2 | 28.3 | 29.7 | 8.59 |
| C6/C2 (mole/mole) | 0.991 | 1.019 | 0.98 | 1.366 | 2.298 | 0.543 |
| H2/C2 (mole/mole) | 0.0055 | 0.003 | 0.0039 | 0.004 | 0.0032 | 0.0084 |
| T (° C.) | 80 | 80 | 80 | 80 | 80 | 85 |
| Residence time (h) | 1.35 | 1.35 | 1.34 | 1.29 | 1.33 | 0.63 |

TABLE 2 polymer properties

| EXAMPLE | 1 | 2 | 3 | 4 | 5 | 6 | Comp 0 | Comp 1 | Comp 2 |
|---|---|---|---|---|---|---|---|---|---|
| HOMOPOLYMER BLOCK A | | | | | | | | | |
| wt % A | 50.0 | 51.4 | 49.1 | 51.1 | 50.9 | 50.0 | n.a. | 48 | 49.5 |
| MI$_2$ (g/10 min) | 126 | 238 | 244 | 375 | 456 | 216 | n.a. | 400 | 400 |
| FINAL RESIN | | | | | | | | | |
| Comonomer | hexene | hexene | hexene | hexene | hexene | hexene | hexene | butene | hexene | butene |
| Comonomer - wt % | 1.2 | 1.2 | 1.2 | 0.9 | 1.0 | 1.2 | 0.7 | 1.5 | 1.1 |
| MI$_5$ (g/10 min) | 0.29 | 0.25 | 0.25 | 0.24 | 0.26 | 0.23 | 0.22 | 0.30 | 0.16 |
| Density (kg/m$^3$) | 950.9 | 950.7 | 950.7 | 950.9 | 949.3 | 950.8 | 962.9* | 959.0* | 960.4* |
| RHEOLOGICAL PROPERTIES | | | | | | | | | |
| $\eta_{100}$ (kPa·s) | 2.396 | 2.374 | 2.471 | 2.288 | 2.260 | 2.309 | 2.192 | 2.184 | 2.655 |
| $\eta_{0.01}$ (kPa·s) | 198.4 | 267.6 | 238.8 | 197.4 | 196.4 | 256.5 | 193.0 | 160.9 | 248.6 |
| ESCR PROPERTIES | | | | | | | | | |
| Notched Pipe Test (h) | 1825 | 3137 | 4519 | 6992 | n.a. | 4397 | 503 | >2000 | >2000 |

*measured on the pigmented compound

The invention claimed is:

1. Composition comprising polymer of ethylene and from 0.5 to 5 wt % of a $C_4$-$C_8$ alpha-olefin which has a natural density of 935-956 kg/m$^3$, a melt index MI$_5$ of 0.15-0.5 g/10 min, a dynamic complex viscosity at 100 rad/s and 190° C. ($\eta_{100}$) of no more than 2500 Pa·s, a relationship between $\eta_{100}$ and dynamic complex viscosity measured in Pa·s at 0.01 rad/s and 190° C. ($\eta_{0.01}$), defined by the equation $\eta_{0.01} > 115000 + 30 \cdot \eta_{100}$, and an environmental stress crack resistance as measured by a notched pipe test performed according to ISO13479:1997 on 110 mm SDR 11 pipes at 80° C. and a pressure of 9.2 bar, of greater than 1000 hours, which composition is formed from a multimodal polyethylene resin comprising from 30 to 70 wt % of an ethylene homopolymer (A) having a melt index MI$_2$ of 100-800 g/10 min and a density of at least 965 kg/m$^3$, and from 30 to 70 wt % of a copolymer (B) of ethylene and a $C_4$-$C_8$ alpha-olefin having a density of 910 to 930 kg/m$^3$, wherein the ratio of homopolymer (A) to copolymer (B) is 48:52 to 55:45.

2. Composition comprising polymer of ethylene and from 0.5 to 5 wt % of 1-hexene, 1-pentene or 1-octene and having a natural density of 935-956 kg/m$^3$, melt index Mk of 0.15-0.5 g/10 min, a dynamic complex viscosity at 100 rad/s and 190° C. ($\eta_{100}$) of no more than 2500 Pa·s, a relationship between $\eta_{100}$ and dynamic complex viscosity measured in Pa·s at 0.01 rad/s and 190° C. ($\eta_{0.01}$), defined by the equation $\eta_{0.01} > 115000 + 30 \cdot \eta_{100}$, and an environmental stress crack resistance as measured by a notched pipe test performed according to ISO13479:1997 on 110 mm SDR 11 pipes at 80° C. and a pressure of 9.2 bar, of greater than 1000 hours, which composition is formed from a multimodal polyethylene resin comprising from 30 to 70 wt % of an ethylene homopolymer (A) having a melt index MI$_2$ of 100-800 g/10 min and a density of at least 965 kg/m$^3$, and from 30 to 70 wt % of a copolymer (B) of ethylene and a $C_4$-$C_5$ alpha-olefin having a density of 910 to 930 kg/m$^3$, wherein the ratio of homopolymer (A) to copolymer (B) is 48:52 to 55:45.

3. The composition according to claim 1 or 2, which has a dynamic complex viscosity at 0.01 rad/s and 190° C. ($\eta_{0.01}$) of at least 190000 Pa·s.

4. The composition according to claim 1 or 2, which has an MI$_5$ of 0.2-0.32 g/10 min and a natural density of 946-953 kg/m$^3$.

5. The composition according to claim 1 or 2, wherein the homopolymer (A) has a melt index MI$_2$ of 250-700 g/10 min.

6. The composition according to claim 1 or 2, wherein copolymer (B) has a melt index MI$_5$ of at least 0.001-2 g/10 min.

7. The composition according to claim 1 or 2, wherein copolymer (B) has a property selected from the group consisting of a melt index MI$_5$ of at least 0.005 g/10 min, a density of no more than 928 kg/m$^3$, and both a melt index MI$_5$ of at least 0.005 g/10 min and a density of no more than 928 kg/m$^3$.

8. The composition according to claim 1 or 2, which has a critical pressure Pc for halting of crack propagation of at least 10 bar as measured at 0° C. on a pipe of diameter 110 mm and thickness 10 mm in the small-scale steady state (S4) test according to ISO 13477:1997.

9. Process for preparing a composition as defined in claim 1 or 2, comprising the steps of:

either polymerising ethylene in a first reactor to form ethylene homopolymer (A), and then in a second reactor polymerising ethylene plus either 1-hexene, 1-pentene or 1-octene and optionally another alpha-olefin containing from 4 to 10 carbon atoms in the presence of homopolymer (A) to form ethylene copolymer (B); or polymerising ethylene plus either 1-hexene, 1-pentene or 1-octene and optionally another alpha-olefin containing from 4 to 10 carbon atoms in a first reactor to form ethylene copolymer (B), and then in a second reactor polymerising ethylene in the presence of copolymer (B) to form ethylene homopolymer (A).

10. The process according to claim 9 which is a suspension (slurry) polymerisation.

11. The process according to claim 9, wherein:

in a first reactor, ethylene is polymerised in suspension in a medium comprising a diluent, hydrogen, a Ziegler-Natta catalyst and a cocatalyst so as to form from 30 to 70% by weight with respect to the total weight of the composition of ethylene polymer (A), said medium comprising polymer (A) in addition is drawn off from said reactor and is subjected to expansion so as to degas at least part of the hydrogen, after which said at least partially degassed medium comprising polymer (A) and some ethylene and 1-hexene, 1-pentene or 1-octene and optionally at least another alpha-olefin containing from 4 to 10 carbon atoms are introduced into a further reactor in which polymerisation in suspension is effected in order to form from 30 to 70% by weight with respect to the total weight of the composition of ethylene copolymer (B).

* * * * *